Patented Jan. 14, 1936

2,027,584

UNITED STATES PATENT OFFICE 2,027,584

METHOD FOR TREATING MATERIALS CAPABLE OF UNDERGOING DISPERSION IN WATER AND FOR OBTAINING AQUEOUS DISPERSIONS THEREFROM

Leonard G. Gabriel, John F. T. Blott, William L. Peard, and Lawrence W. G. Firmin, London, England, Louis Meunier, Lyon, France, and Johan L. van der Minne, Amsterdam, Netherlands, assignors, by mesne assignments, to The Flintkote Company, New York, N. Y., a corporation of Massachusetts No Drawing. Application June 15, 1932, Serial No. 617,470. In Great Britain June 18, 1931

12 Claims. (Cl. 134—1)

This invention concerns a method for treating petroleum oils, oil fractions or distillates, or residues obtained from the distillation or treatment of such oils, such as bitumens, pitches and the like, in order that residues obtained from said oils, oil fractions or distillates, or the said residues when dispersed in water shall have relatively higher viscosities, than could be obtained from the untreated materials under similar conditions of dispersion, and it concerns also the production of aqueous dispersions having higher viscosities from materials treated in accordance with the invention than could be obtained with the untreated materials under similar conditions of dispersion.

For many purposes, for instance in the employment of aqueous dispersions for road making, the use of dispersions of high viscosity is often very desirable. The usual methods of producing such a dispersion consist in increasing the relative percentage of the disperse phase, which means an increased cost of the final product, or in adding to the continuous phase or to the dispersion some thickening agent, the presence of which might be very undesirable. If, however, the bituminous material can be so treated that a corresponding percentage would give rise to a higher viscosity of the dispersion than would a corresponding percentage of untreated material, then the necessity for increasing the bitumen content or adding a thickening agent is avoided.

It is known that aqueous dispersions of certain bitumens exhibit particularly high viscosities and we have ascertained that these are due to the presence in the disperse phase of certain constituents the effect of which is to absorb water from the continuous phase. We have also ascertained that the equilibrium reached after absorption of the water from the continuous aqueous phase is controlled by the respective osmotic pressures in the fixed or absorbed water occluded in the dispersed bituminous materials and in the continuous aqueous phase. In the equilibrium state these respective osmotic pressures are equal.

As is known, the viscosity of an aqueous dispersion under any given conditions is dependent upon the concentration of the disperse phase in the system. If, therefore, such disperse phase can be made to occlude water which would normally constitute part of the continuous phase, the concentration of the disperse phase will be augmented and the viscosity will be thereby increased.

According to the present invention the method of treating crude petroleum oils, oil fractions or distillates, or residues obtained from the distillation or treatment of such oils such as bitumens, pitches and the like in order that residues obtained from said oils, oil fraction or distillates, or the said residues when dispersed in water shall yield aqueous dispersions having relatively higher viscosities than could be obtained with the untreated residues when dispersed under similar conditions, consists in dispersing or forming in the raw materials relatively small quantities of substances which are water-soluble or which are in solution in water or which swell or gel with water, or dispersing or forming in the raw materials relatively small quantities of substances which, on contact with water, yield solutions of water-soluble substances, all of such substances, when dispersion of the residues in water is effected, causing an absorption of water from the continuous phase into the disperse phase, such dispersion or formation with small quantities of the substances being so effected that when the residues are finally dispersed in water the particles of the substances or solutions in the disperse phase of the residues are substantially smaller in size than the sizes of the dispersed particles themselves. When the residues are dispersed in water the solutions of the substances introduced or formed within the dispersed particles exhibit osmotic pressures which are initially greater than those exhibited by the continuous phase.

Examples of substances which serve the aforesaid purpose are water-soluble salts, for instance chlorides, sulphates, nitrates, acetates, etc. of the alkali metals, water-soluble acids, water-soluble hydroxides, or in general electrolytes, further water-soluble organic compounds such as carbohydrates, for instance cane sugar, or alcohols such as glycerine or glycol, phenols such as cresol, etc. Another class of substances such as gelatine, which are colloidally soluble in water, or, may be used is lyophile colloids, which, whilst not being properly soluble in water, may cause a substantial water absorption into the disperse phase owing to the fact that they swell or gel with water. In the case afore-mentioned the osmotic equilibrium arising will not be of the same type as that obtained in the case where water-soluble substances such as electrolytes or carbohydrates are employed, but will be akin to that known as the Donnan equilibrium.

A further example of a substance which serves the aforesaid purpose is a compound which is soluble in or readily dispersed in the bituminous material and which on contact with water yields a water-soluble substance. Thus, for instance, trichlorethylene on coming into contact with water will split off hydrochloric acid. We have found that if 1% of trichlorethylene is incorporated with bituminous materials the viscosity of aqueous dispersions made therefrom is materially increased.

In short, any substance which will, when in aqueous solution, give rise to a sensible osmotic pressure, may be employed for the purpose of the invention.

The substances may be incorporated into the material to be treated in the solid state or in solution or may be formed within the material. If the substances are incorporated with the material in solution, the mixture prior to dispersion may be subjected to treatment, such as drying or distillation, until the solvent is substantially volatilized off. If desired the distillation may be continued until the material has reached the requisite degree of hardness or penetration. Alternatively the mixture may be dispersed without undergoing drying or distillation.

According to the invention the method of producing aqueous dispersions possessing higher viscosities from bituminous or hydrocarbonaceous materials treated as described above than could be obtained with untreated materials dispersed under otherwise similar conditions is effected according to any of the methods normally employed for producing dispersions of this nature and with the aid of any known emulsifying or dispersing agents and/or stabilizers.

According to the invention we have also found that the substance, in order to be effective, must be dispersed in particles of such size that they are small as compared with the size of the dispersed particles of the material in the final aqueous dispersion. If the particles of the substance approach the magnitude of the dispersed particles of the materials we have found that after absorption of the water the diameter of the water globules will in general be too large to allow of the dispersed particles remaining stable, with the result that the dispersed particles disrupt, with consequent discharge of the substance into the bulk of free aqueous phase, where it has the opposite effect to that required.

In some cases the incorporation of the substance in a sufficiently fine distribution is produced by merely mixing the substance with the material to be dispersed, which when normally solid may preferably be brought into the liquefied or semi-liquefied condition, for example by heating. If a sufficiently fine distribution is not easily obtained by merely mixing the substance with the liquefied material, special methods may be used for the incorporation. Thus, for instance, when it is desired to prepare an oil distillation bitumen yielding highly viscous dispersions, a suitable quantity of sodium chloride or other electrolyte may be incorporated into the crude oil, topped crude oil or fuel oil from which the bitumen is to be obtained as a distillation residue.

If desired, the substance to be incorporated with the dispersible materials may be added to a portion of the total quantity of material to be dispersed, which may then be mixed with the remaining portion. Thus, for instance, if a bitumen of say penetration 300 is being prepared for dispersion by admixture of fuel oil with a harder bitumen, the fuel oil, or a portion thereof, may be treated with the substance and then mixed with the hard bitumen, or with the hard bitumen which has been fluxed with an untreated portion of the fuel oil.

In order to obtain a sufficiently fine distribution of the substance in the material under treatment there may be added to the material, prior to its dispersion in water, a small quantity of a dispersing agent suitable for producing a water-in-oil dispersion, whereby it becomes possible to incorporate the substance into the material in the form of a water-in-oil dispersion. In other words, the material as finally dispersed in water contains the substance in a dispersed condition, which dispersion has been effected by the addition of an agent promoting the water-in-oil dispersion of the substance. Examples of such agents are water-insoluble soaps, such as aluminium, magnesium or calcium oleates, resinates, sulphonates and analogous substances, which are soluble or dispersible in the material under treatment.

In the practical operation of this embodiment of the invention, an aqueous solution of the substance and the water-in-oil dispersing agent may be added separately to the material to be dispersed; or, alternatively, a dispersion of the substance in the said dispersing agent may first be prepared and this dispersion added to the material under treatment, which may, if desired, be subjected to further treatment, such as drying or distillation, before undergoing dispersion.

As stated above, the substance can only exert its viscosity-increasing action as long as it remains incorporated in the dispersed particles of the material; when discharged into the continuous phase it will have the opposite effect to that required. In view thereof it is of importance in carrying the invention into practice that the dispersion of the substance in the particles of the material remains unaffected i. e., substantially stable for some time.

The process according to the invention allows of a very advantageous control of the viscosities to be produced in the final dispersions. Thus, for instance, in the manufacture of bituminous dispersions, such as for road-making, by known emulsifying processes, it will in many cases be possible to increase the viscosity of the final dispersion to about 2 or 3 or even 5 or 6 times the viscosity obtained in normal operation when not using the process according to the invention.

The dispersions obtained with bituminous or other materials treated according to the invention, in common with dispersions having a similar viscosity but not so prepared, exhibit a rise in viscosity during the period immediately following manufacture, when the viscosity rises to a maximum value and then falls to a somewhat lower value, which latter remains more or less constant.

In general, when properly operating the present process the viscosity produced will be relatively stable, i. e. there will be no abnormal retrogression of the viscosity during the normal period of storage of the dispersion. It has been ascertained that the retrogression, if any, may be less than that normally occurring in viscous dispersions made without applying the present invention.

In the practice of the invention it was found that the substances used for producing the water-in-oil dispersion of the substance in the material under treatment also have the effect of producing a very stable viscosity. In special cases it may be desired to add a substance specially acting as a viscosity stabilizer, said addition preferably being made to the material to be dispersed together with the substance. Examples of such stabilizers are alkali sulphonates, gum dammar, and other similarly acting substances.

The following examples serve further to illustrate the treatment of materials and the production of aqueous dispersions therefrom according to this invention:

1. Into an asphaltic base crude oil, topped crude or fuel oil, 1.75% of its weight of a 0.57% solution of sodium chloride is introduced by successive passages through a rapidly revolving disintegrator of the type generally known as a colloid mill or any apparatus allowing of a thorough intermingling. The oil thus treated is then subjected to a normal distillation operation such as applied for the production of a residual pitch suitable for road-making, and the distillation is continued until the residual pitch has a penetration, under standard conditions, of 200. This pitch is then dispersed with a 1.5% solution of potassium oleate by means of a so-called Hurrell mill to produce a dispersion containing 58% of the bitumen. Its viscosity was 0.37 poises.

By way of comparison, a dispersion was made under similar conditions with some residual pitch, which had been obtained by distilling some of the same batch of fuel oil to the same degree of penetration and this possessed a viscosity of 0.25 poises.

2. Into a petroleum residual pitch of Venezuelan origin, which has been distilled to a penetration of 300, under standard conditions, 3.4% of its weight of a 0.57% solution of sodium chloride is introduced as in Example 1, the pitch being liquefied by heating at a temperature of e. g. 90–120° C. A dispersion prepared from this treated bitumen as in Example 1 had a bitumen content of 58% and a viscosity of 0.44 poises.

A dispersion prepared for comparative purposes, under similar conditions with untreated pitch of the same batch, had a viscosity of 0.12 poises.

3. Under the same general conditions as above, 0.2% of a 20% aqueous solution of sodium nitrate is introduced, under thorough agitation, into the material to be dispersed, whereupon the latter is dispersed in an equal quantity of an aqueous solution containing 1% of potassium oleate and 0.05% of potassium hydroxide.

4. Under the same general conditions as above, 0.1% of an hydrochloric acid solution of commercial strength is introduced, under thorough agitation, into the material to be dispersed, whereupon the latter is dispersed in about an equal quantity of an aqueous solution containing 1% of potassium oleate and a sufficient excess of alkali to neutralize the hydrochloric acid and maintain a slight alkalinity in the finished dispersion.

5. An oil distillation bitumen of Venezuelan origin is intimately mixed with a previously prepared homogeneous mixture of 0.2% of aluminium oleate or stearate, 0.05% of potassium chloride, 0.1 to 0.5% of kerosene or other mineral oil and 0.4% of water, said percentages being by weight of the asphaltic material. The whole is dispersed in an equal quantity of an aqueous solution containing 1% of potassium oleate and 0.05% of potassium hydroxide.

6. The same material as in Example 5 is treated with 0.6% by weight of a homogeneous mixture containing 50% magnesium sulphonate (derived from oil soluble sulphonic acid produced in the sulphonation of lubricating oils or analogous oil fractions), 25% spindle oil, 10% sodium chloride and 15% water, and thereupon dispersed as in Example 5.

7. 0.3–0.5% of glycerine is thoroughly stirred into a bitumen of the kind referred to in Example 2, liquefied by heating at 90–120° C. and the material is then dispersed as in Example 5.

8. In Example 7, part of the glycerine, is replaced by an alkali salt, thus using for instance 0.2% of glycerine and 0.02% of sodium chloride (by weight of the material under treatment), the said ingredients being thoroughly mixed before their incorporation into the materials.

9. In either of the Examples 7 or 8, the glycerine with or without added salt, is mixed with an amount of oil-soluble sodium sulphonate (derived from oil soluble sulphonic acid produced in the sulphonation of lubricating oils or analogous oil fractions) in the proportion of 0.01% by weight of the material to be dispersed.

10. Equal quantities of a 20% sodium acetate solution in water and a 4% gum dammar solution in mineral oil are emulsified together, and 1% of this mixture is added under strong agitation to an oil distillation bitumen heated to 90–120° C., which is thereupon dispersed as in Example 5.

11. 1% of a 20% gelatine solution in water is incorporated with liquefied bituminous material, and thereupon the material is dispersed as in Example 4.

It will be noted from the foregoing examples that the new technical effects obtained by means of this invention are produced by the addition of only relatively small quantities of the substances.

It should be understood that according to this invention only such treatment with the aforesaid substances is applied as will leave the physical properties of the originating materials such as viscosity, melting point, elasticity and the like substantially unaltered. Their behaviour upon dispersion in aqueous media is altered as indicated.

We are aware that substances have been added to bituminous or hydrocarbonaceous materials for various purposes. Thus, for example, it is known in the manufacture of aqueous dispersions of bituminous or hydrocarbonaceous materials to treat the materials to be dispersed with various substances, such as water-insoluble pigments or fillers, or organic solvents including chlorinated hydrocarbons or substances such as metallic oxides or hydroxides preferably of the alkaline earth series exerting under the influence of applied heat a chemical action on the bitumen or on certain constituents thereof so as to modify the viscosity and other physical properties of the material or its dispersive capacity, or substances acting on their discharge into the continuous phase as dispersing agents either as such or in combination with agents directly added to the continuous phase. We are furthermore aware that it has already been proposed to add basic substances to crude oils or oil fractions in order to fix the natural emulsifier contained therein, whereupon the mixtures thus obtained are distilled and the distillation residues are dispersed in water or in an aqueous alkaline liquid, if desired after treatment of the said residues with an acid thus setting free the emulsifier and uniting with the base to form a salt. We make no claim herein to any of these prior proposals.

In contradistinction to these prior proposals and according to our invention we have recognized and applied the important factor of producing within the dispersed particles of the residues osmotic pressures which are initially greater than those exhibited by the continuous phase, thereby causing absorption of water from the continuous phase into the disperse phase.

What we claim is:

1. A method of treating crude petroleum oils, oil fractions or distillates, or residues obtained from the distillation or treatment of such oils, such as bitumens, pitches, and the like, in order that residues obtained from said oils, oil fractions or distillates, or the said residues themselves when dispersed in water shall yield aqueous dispersions having relatively higher vicosities than could be obtained with the untreated residues when dispersed under otherwise similar conditions, which consists in combining with said materials substances which are water-soluble, and in quantities sufficiently low to be capable, when dispersion of the residues in water is effected, of producing within the dispersed particles of said residues, osmotic pressures which are initially greater than those exhibited by the continuous phase, thereby causing an absorption of water from the continuous phase into the dispersed phase, such combination with small quantities of said substances being so effected that when said residues are finally dispersed in water, the particles of the substances in the dispersed phase of the residues are substantially smaller in size than the size of the said dispersed particles themselves, and dispersing the thus treated residue in water.

2. A method according to claim 1, wherein the said substances are dispersed in the raw material.

3. A method according to claim 1, wherein the said substances are formed in the raw material.

4. A method of treating crude petroleum oils, oil fractions or distillates, or residues obtained from the distillation or treatment of such oils, such as bitumens, pitches, and the like, in order that residues obtained from said oils, oil fractions or distillates, or the said residues themselves when dispersed in water shall yield aqueous dispersions having relatively higher viscosities than could be obtained with the untreated residues when dispersed under otherwise similar conditions, which consists in dispersing in the said material substances which swell or gel with water, in quantities sufficiently low to be capable, when dispersion of said residues in water is effected, of producing within the dispersed particles of the residues osmotic pressures which are initially greater than those exhibited by the continuous phase, thereby causing an absorption of water from the continuous phase into the disperse phase, such dispersion with small quantities of the substances being so effected that when the residues are finally dispersed in water, the particles of said substances in the disperse phase of the residues are substantially smaller in size than the size of the said dispersed particles themselves, and dispersing the thus treated residue in water.

5. A method of treating crude petroleum oils, oil fractions, or distillates, or residues obtained from the distillation or treatment of such oils, such as bitumens, pitches, and the like, in order that residues obtained from said oils, oil fractions or distillates, or the said residues themselves when dispersed in water shall yield aqueous dispersions having relatively higher viscosities than could be obtained with the untreated residues when dispersed under otherwise similar conditions, which consists in dispersing in the said materials substances which, on contact with water, yield solutions of water-soluble substances, and in quantities sufficiently small to be capable, when dispersion of said residues in water is effected, of producing within the dispersed particles of the residues osmotic pressures which are initially greater than those exhibited by the continuous phase, thereby causing an absorption of water from the continuous phase into the disperse phase, such dispersion with small quantities of the substances being so effected that when the residues are finally dispersed in water the particles of said substances in the disperse phase of the residues are substantially smaller in size than the size of the said dispersed particles themselves, and dispersing the thus treated residue in water.

6. A method as claimed in claim 4, wherein the substances dispersed in the raw materials are lyophile colloids.

7. A method as claimed in claim 1, which consists in intimately mixing the water-soluble substance, with a crude petroleum oil, topped oil or fuel oil, and subsequently subjecting the treated material to distillation so as to yield a residual material suitable for subsequent dispersion in water.

8. A method as claimed in claim 1, which consists in intimately mixing with the material to be treated, in addition to the water-soluble substance, a quantity of a dispersing agent suitable for producing a water-in-oil dispersion of the water-soluble substance in the material.

9. An aqueous dispersion of bitumen in water in which the dispersed particles of bitumen contain dispersed therein water-soluble substances incorporated in the bitumen according to the method of claim 1.

10. A method according to claim 1 wherein the water soluble substance is an inorganic salt.

11. A method according to claim 1 wherein the water soluble substance is a carbohydrate.

12. A method according to claim 1 wherein the water soluble substance is an alcohol.

LEONARD G. GABRIEL.
JOHN F. T. BLOTT.
WILLIAM L. PEARD.
LAWRENCE W. G. FIRMIN.
LOUIS MEUNIER.
JOHAN L. van der MINNE.